United States Patent [19]

Patel et al.

[11] Patent Number: 5,288,980
[45] Date of Patent: Feb. 22, 1994

[54] LIBRARY CHECK OUT/CHECK IN SYSTEM

[75] Inventors: Neil Patel, Irvine; Suhas Desai, Norwalk, both of Calif.

[73] Assignee: Kingsley Library Equipment Company, Pomona, Calif.

[21] Appl. No.: 904,451

[22] Filed: Jun. 25, 1992

[51] Int. Cl.$^5$ .............................................. G06F 7/08
[52] U.S. Cl. ................................... 235/381; 235/380; 235/440; 340/572
[58] Field of Search ............... 340/568, 572; 235/380, 235/440, 381; 250/293

[56] References Cited

U.S. PATENT DOCUMENTS

| | | | |
|---|---|---|---|
| 2,161,635 | 6/1939 | Prokopenko | 177/311 |
| 2,179,240 | 11/1939 | Breitenstein | 177/311 |
| 3,020,470 | 2/1962 | Shawhan et al. | 324/3 |
| 3,221,304 | 11/1965 | Enikeieff et al. | 340/149 |
| 3,247,486 | 4/1966 | Choisser et al. | 340/164 |
| 3,292,080 | 12/1966 | Trikilis | 324/41 |
| 3,423,674 | 1/1969 | Goldsmith et al. | 324/45 |
| 3,444,458 | 5/1969 | Scott | 324/34 |
| 3,453,598 | 7/1969 | Schweizer | 340/149 |
| 3,457,502 | 7/1969 | Cohn | 324/34 |
| 3,473,110 | 10/1969 | Hardin et al. | 324/34 |
| 3,473,111 | 10/1969 | Leersnijder | 324/41 |
| 3,509,535 | 4/1970 | Berube | 340/149 |
| 3,564,214 | 2/1971 | Cooper | 235/61.11 |
| 3,665,449 | 5/1972 | Elder et al. | 340/280 |
| 3,691,350 | 9/1972 | Kuhn et al. | 235/380 |
| 3,747,086 | 7/1973 | Peterson | 340/280 |
| 3,765,007 | 10/1973 | Elder | 340/280 |
| 3,778,169 | 12/1973 | Adams | 356/172 |
| 3,781,661 | 12/1973 | Trikilis | 324/34 |
| 3,790,945 | 2/1974 | Fearon | 340/280 |
| 3,820,103 | 6/1974 | Fearon | 340/280 |
| 3,820,104 | 6/1974 | Fearon | 340/280 |
| 3,859,072 | 1/1975 | Fendley et al. | 65/42 |
| 3,914,578 | 10/1975 | Bigelow et al. | 235/61.7 |
| 3,930,824 | 1/1976 | Knowles | 65/37 |
| 3,938,125 | 2/1976 | Benassi | 340/280 |
| 3,954,435 | 5/1976 | Fendley et al. | 65/54 |
| 3,978,425 | 8/1976 | Knowles | 331/94.5 |
| 3,983,552 | 9/1976 | Bakeman, Jr. et al. | 340/280 |
| 3,990,065 | 11/1976 | Purinton et al. | 340/280 |
| 4,020,357 | 4/1977 | Punis | 250/568 |
| 4,034,211 | 7/1977 | Horst et al. | 235/487 |
| 4,050,037 | 9/1977 | Knowles et al. | 331/94.5 |
| 4,141,078 | 2/1979 | Bridges, Jr. et al. | 235/385 |
| 4,153,931 | 5/1979 | Green et al. | 364/200 |
| 4,251,798 | 2/1981 | Swartz et al. | 340/146.3 |
| 4,729,128 | 3/1988 | Grimes et al. | 235/380 |
| 4,881,061 | 11/1989 | Chambers | 340/568 |
| 5,153,562 | 10/1992 | van Breeman | 340/572 |

FOREIGN PATENT DOCUMENTS

| | | | |
|---|---|---|---|
| 763681 | 11/1933 | France . | |
| 2-83686 | 3/1990 | Japan | 235/462 |
| 3-99381 | 4/1991 | Japan | 235/462 |

OTHER PUBLICATIONS

The Protean, vol. 2, No. 1, Winter 1972 "Survey of Theft Detection Systems".
Advertising for Checkpoint Systems, Inc. "Prevent Library Theft", No Date.
Library Security Newsletter, vol. 1, No. 3 May/Jun.

(List continued on next page.)

Primary Examiner—Donald Hajec
Assistant Examiner—Adrian Young
Attorney, Agent, or Firm—Stetina & Brunda

[57] ABSTRACT

A self check out/check in terminal is disclosed for facilitating independent withdrawal or return of articles having article identifying indicia on opposing surfaces thereof, and alterable security indicia for indicating the circulation status of the article. The terminal comprises first and second readers disposed at space opposed locations and operative to read the plurality of article identifying indicia and generate first and second article identifying signals in response thereto. Processing circuitry is provided in electrical communication with the readers and includes comparator circuitry for receiving the first and second article identifying signals and for generating a third signal when said first and second article identifying signals are substantially identical. Security indicia control circuitry is provided for altering the security indicia upon the article in response to the generation of the third signal.

17 Claims, 3 Drawing Sheets

OTHER PUBLICATIONS

1975, "Theft, Mutilation and the Loss-To-Use Ratio".
National Survey on Library Security No Month SLA News, vol. 144, 1978, "Essentials of Library Security".
"Applications of Minicomputers to Library and Related Problems", University of Illinois, Grad. School of Lib. Science No Date.
"Planning for Diversity Strategic Planning for an Urban Academic Library" No Date.
"Credit Card Control Speeds Library Data Flow" Ohio Library Association Bulletin, Jan. 1967.
Canadian Library Journal, vol. 32, No. 3, Jun. 1975 "3-M Tattle Tape The Eye That Never Sleeps".
"Magnetized Plate Said to Cut Library Thefts" Jun. 21, 1971.
Library Journal, "Measuring and Reducing Losses", Feb. 15, 1973.
Library Review, vol. 22, No. 7, Autumn 1970.
The Australian Library Journal, May 1973 "A Year of Electronic Security".
New Library World, vol. 73, No. 87, Nov. 1971.
Assistant Librarian, Jan. 1975, vol. 68, No. 1.
The Australian Library Journal, vol. 24, No. 2 Mar. 1975.
Liaison, May 1975, "The Cost of Lending Right".
The Library Essence, vol. 3, No. 4, Dec. 1974.
The Library Scene, "Stop Thief" No Date.
Feliciter, Newsletter of Canadian Library Association May 1975, "BPDC Sends Brief to Faulkner".
Wyoming Library Roundup, Mar. 1976.
Virginian Librarian, vol. 21, No. 4, Oct./Nov. 1975.
Wisconsin Library Bulletin, vol. 72, No. 1 Jan./Feb. 1976.
Wisconsin Library Bulletin, May-Jun. 1977 "Security Systems".
Library Journal, Mar. 15, 1976, "Tough Security Measures Adopted by Research Libraries".
Library Journal, Jan. 15, 1976, "Metro Security Seminar: Fire, Crime & Insurance".
Library Journal, Feb. 15, 1975, "Tattle-Tale Security".
Library Journal, Jun. 15, 1975, "Library Security: Theft, Arson, Prevention".
Wilson Library Bulletin, May 1972, "Information Exchange".
Technical Note 52, "Library Book Theft Detection", No Date.
Library Journal, Feb. 1, 1966, "Your Changing System Is It Thiefproof?".
C&RL News, Sep. 1985, "Will My Disks Go Floo If I Take Them Through?".
Wilson Library Bulletin, May 1971, "The Barriers To And Barriers Of Library Security".
Operations Report Jan. 1975, Bradford Central Library: Security System.
Library Security Newsletter, vol. 1, No. 4, Jul. 1975.
ALA Yearbook, "A Review of Library Events 1975".
Library Security Newsletter, vol. 1, No. 2, Mar. 1975.
Library Security Newsletter, vol. 1, No. 1, Jan. 1975.
The Protean Speaks, vol. 2, No. 1, Winter 1972.
College & Research Libraries, Jul. 1968, vol. 29, No. 4.
College & Research Libraries, May 1967 "Exit Controls & The Statewide Card".
Library Journal, May 15, 1973, "Library Security Roundup: Reports From the Field".
AS&U, Aug. 1974, "Electronic System Prevents Book Theft".
AS&U, Aug. 1976, "Electronic Detection System Reduces Losses in Library".
SLJ School Journal, Apr. 1977, "Library Material Security System, A School District's Experience".
College & Research Libraries, Mar. 1967, vol. 38, No. 2 "Electronic Protection of Library Materials".
Bull. Bibl. France, Paris, vol. 20, No. 4, 1975 "Un Nouveau Systeme De Detection Des Vois Dans Les Bibliotheques: Le Tattle Tape 3M".
Zeitschrift Fur Bibliothekswesen Und Bibliographie Jahrgang 23, 1976, Heft 4, Jul.-Aug.

LIBRARY CHECK OUT/CHECK IN SYSTEM

BACKGROUND OF THE INVENTION

This invention relates principally to a self operated check-in check-out terminal for books or other articles to be removed from or returned to a library or other facility. Such a terminal may be the principal component of a computerized library circulation system, performing operations that are conventionally performed by a librarian. The system speeds the performance of check in/check out operations and relieves the librarian to perform other tasks.

A conventional library check-out procedure is as follows. The patron supplies his library card to the librarian. The card usually has a bar code, either printed or recorded on magnetic tape to identify the patron to the librarian. The librarian scans the card in a reader. The reader sends the patron's coded identity to a computer data base maintained by the library to determine the status of the patron's account. After it is determined that the account is in proper order by a signal to the librarian, the librarian scans a bar code printed on a surface of the article with a reader, which then compares the bar code with a data base to determine the circulation status of the article. Where the data base indicates that the article may be checked out, the system operates to modify the circulation status to indicate that the book is being checked out. Many libraries are also equipped with security surveillance devices responsive to the magnetic state of material applied to the article. Once the librarian has determined that the patron status and article circulation status are acceptable, the article may be handed to the patron on the far side of a surveillance gate, or passed over a magnetic desensitizer which permits the patron to pass the article through the security gate without triggering an alarm condition.

Some libraries have patron self check-in check-out systems that are generally operated as follows. To check out a book the patron places his library card in a reader that scans his identification code. As described previously, a computer data base is activated and provides a display screen the status of the patron's account. If the patron's account is in order, the patron proceeds to pass the coded label on the book by a scanner in the terminal. If the circulation status of the book allows it to be checked out/checked in, the system then records the transaction then enables the adjacent security surveillance device to sensitize/desensitize the magnetic material, thereby allowing the patron to carry the book through the security gate.

Such a computerized library circulation control system are described in the prior art. For example, U.S. Pat. No. 3,665,449 (Elder et al.), describes the use of magnetic materials on the article to be sensed later at a security gate for electronic article surveillance. The Elder patent further discloses the integration of a security magnetic security system with a book circulation control system. The magnetic security system operates to change the state of the magnetic security marker upon verification of the book circulation status and the patron account status. U.S. Pat. No. 4,141,078 (Bridges, Jr. et al.) provides more detail of a system integrating the book circulation control system and a security system. The Bridges patent is more particularly directed to the construction of such a system including a particular means for deterring patron abuse through efforts demagnetize additional books that have not cleared the circulation control system. Specifically, the Bridges patent proposes the construction of a chute having an inclined surface surrounded by optical sensors, wherein only a single book is disposed within the view of the scanner and additional books are urged downwardly away from the scanner. Consequently, the demagnetizer disposed adjacent the scanner will only demagnetize a single book. Efforts to hold two books in the region of the scanner will trigger the optical sensors, precluding any demagnetization.

Though systems such as that disclosed in the Bridges patent are useful to permit a patron to check in and check out books, they suffer from significant practical shortcomings related to the efficiency and reliability of the system.

The present invention significantly improves upon contemporary systems in that it avoids the need for chutes or other types of inclined surfaces that hinder practical efficiency, particularly where the system thruput is high. The present invention further avoids the need for a ring of optical scanners that may inadvertently triggered in the course of checking in or checking out a large number of books. Additionally, the present invention provides significant additional security as a consequence of the use of dual scanners, rather than a single scanner. Accordingly, as described below, the present invention allows for significant improvements in the practical implementation of library circulation control systems suitable for independent patron usage.

SUMMARY OF THE INVENTION

A self check out/check in terminal is disclosed for facilitating independent withdrawal or return of articles having article identifying indicia on opposing surfaces thereof, and alterable security indicia for indicating the circulation status of the article. The terminal comprises first and second readers disposed at space opposed locations and operative to read the plurality of article identifying indicia and generate first and second article identifying signals in response thereto. Processing circuitry is provided in electrical communication with the readers and includes comparator circuitry for receiving the first and second article identifying signals and for generating a third signal when said first and second article identifying signals are substantially identical. Security indicia control circuitry is provided for altering the security indicia upon the article in response to the generation of the third signal.

The system may further incorporate user identification circuitry for receiving a user identification card having user identifying indicia disposed thereon, and for generating a user identification signal in response thereto. A user identification circuitry may incorporate a third reader, or, alternatively, may utilize the first or second reader, on a time shared basis.

User status information and article circulation status information may be maintained in a memory circuit disposed within the terminal, or may be accessed from a separate location. Memory or memories incorporating such information may be updated on a periodic basis from an external location.

The security indicia control circuitry may further be gated by information respecting the patron status, e.g. the status of the patron's account. Additionally, the operation of the security control circuitry may be gated by a sensor disposed adjacent the readers to insure that the single article remains in place during the entire processing. Removal of the article from the field of the scanner will generate a signal within the electronic data processor, disabling the security control circuitry.

Various types of article and patron identification indicia may be utilized in conjunction with the system. Indicia may be formed as a label comprised of printed or magnetically recorded bar code information. Alternatively, the identification indicia may be formed as coated semiconductor or ultrasonic transmitter operative to generate an output signal upon receipt of an appropriate interrogation signal.

DETAILED DESCRIPTION OF THE PREFERRED EMBODIMENT

The detailed description set forth below in connection with the appended drawings is intended as a description of two presently preferred physical embodiments of the invention, and is not intended to represent the only forms in which the present invention may be constructed or utilized. It is to be understood that the same or equivalent functions of the invention set forth herein that may be accomplished by different embodiments are intended to be encompassed within the spirit and scope of this invention. Furthermore, it is to be understood that the use of the invention is applicable to other than library articles in a library circulation system and articles in an inventory as described herein.

The present invention is principally directed to a terminal in a self check-in check-out library circulation system that performs a number of system functions virtually at the same time when a book or other article is inserted into the terminal. These functions include identifying the article, determining the status of the article, maintaining the status of the articles in the circulation system, identifying the patron who is removing or returning the identified article from the library, and coding or decoding a security label on the said article. In some applications the system may also operate to read the security label at a security gate, and/or enable a printer to print a return due date label. The terminal can also be used to enter in or to remove an article from an inventory in a central electronic data processor, either electronically in real time or periodically electronically or manually, for example, with a floppy magnetic disc.

Figure 1:
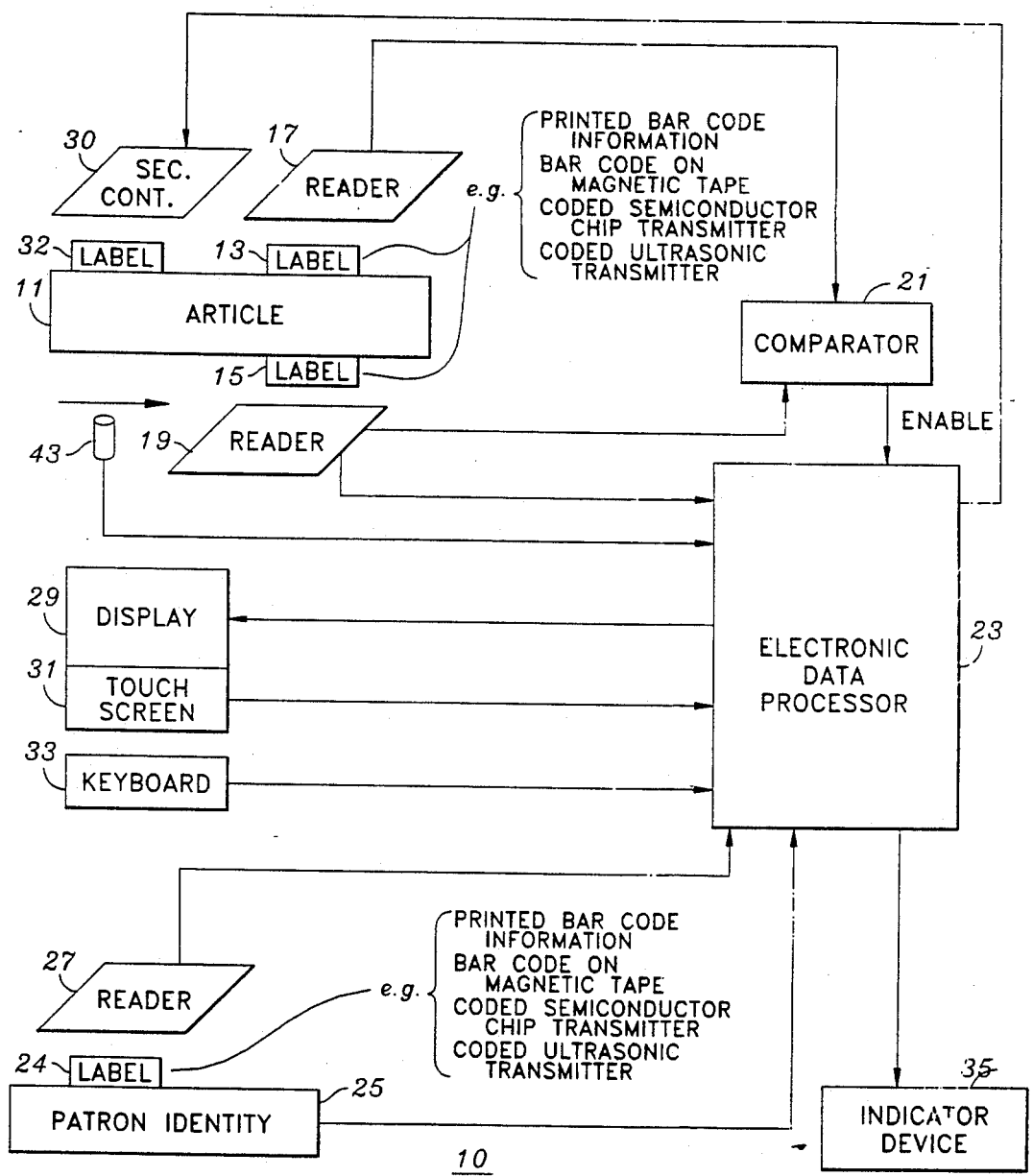
FIG. 1 is a diagram of the components of the terminal of this invention showing their interconnection and indicating their functions.

The components of an exemplary terminal 10, the interconnection of those components, and an indication of the function of those components is generally shown at FIG. 1. Shown in FIG. 1 is a book or other article 11 with substantially identical labels 13, 15 on opposite sides of the article. These labels are coded to identify uniquely a specific article. The article 11 is passed by two spaced readers 17, 19 that scan the labels 13, 15. Each reader generates an electrical signal representing the coded indicia on the two labels. The two signals are fed to a comparator 21. Assuming only a single article is presented the two labels read by the readers should be substantially identical, and therefore the reader outputs should also be substantially identical. When and only when the two reader outputs are substantially identical, the comparator 21 generates an electrical enable signal to an electronic data processor 23. The electronic data processor 23, conventionally includes program and data memories, logic circuits and input/output circuits, which impart to it the capability of initiating and controlling the library circulation system and security system functions. On receipt of the enable signal from the comparator 21, the processor 23 obtains from one of the readers, e.g. reader 19, the signal which identifies the article and proceeds to generate commands to perform the library circulation system functions, e.g. check book circulation status. Those functions are not performed until the processor 23 receives the enable signal from the comparator 21, which signal determines that only one article at a time has been inserted into the terminal 10.

Upon completion of the library circulation system functions, e.g. after verifying that the book may be checked out and updating the books circulation status, the terminal operates to enable the security indicia control circuitry 30. In turn the security indication control circuitry is operative upon label 32 to modify the electronic or magnetic state of label 32 to allow the article 11 to be carried through the security gate. Conventionally, security control circuitry 30 may be a magnetic sensitizer/desensitizer unit operative to change the magnetic state of label 32. As indicated above such change of state will only occur where the readers confirm that only a single article is in place and the data processor confirms that the circulation status of the article allows it to properly be checked out/checked in. As described below the terminal 10 can additionally be expanded to require satisfactory confirmation of the user identity, and a verification of the user account before security control circuitry is enabled. Additionally, the article 11 may incorporate a scanner to insure that the article 11 remains in place throughout the process and is not replaced with a different article before the security control circuitry is enabled.

As shown at FIG. 1, the terminal 10 can be configured to identify the patron by having the patron's coded identification label 24 on the user or patron's identification card 25 read by a reader 27 and sent as an electrical signal to the processor 23. The user identification reader 27 may be the same reader as one of the article identification label readers 17, 19, or a separate reader. The processor 23 operates to receive user identification indicia from reader 27, and to determine the status of the patron's account. The processor may then conveys a message to the patron to proceed to insert said articles into the terminal. Sensor 43 is shown disposed adjacent reader 19. Sensor 43 is may be configured as a light sensor which is operative to indicate whether or not an article 11 remains in place adjacent readers 15, 17 and security control circuitry 30. In the event article 11 is removed from that position, e.g. in an effort to cheat the system by inserting a different article before security control circuitry is enabled, the processor 33 will sense the removal of article 11 and will terminate the processing of the transaction. Thereafter the security control circuitry 30 will not be enabled unless the process is reinitiated and the article is maintained in place until the process is completed.

Upon completion of generating the commands, the processor generates activates an indicator to the patron that the article 11 may be removed from the terminal 10 and the terminal is ready to accept another article. The indicator device can be a lamp or set of lamps with legends, an illuminated display screen, or an audio enunciator. As is shown in FIG. 1, the electronic data processor 23 can communicate information to the patron by generating information or a panel or screen display 29 or indicator device 35. Additionally, a keyboard 31 or a touch-screen cathode-ray-tube monitor 33 can be used to supply information, instructions and selections to the processor 23.

Figure 2:
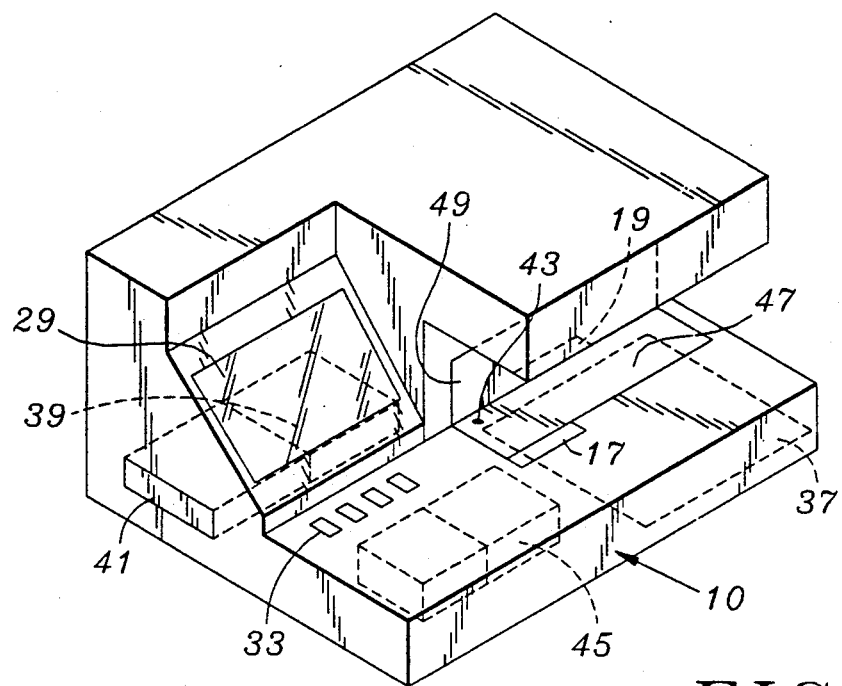
FIG. 2 is a prospective view illustrating a physical embodiment of the terminal of this invention.

A physical embodiment of the terminal 10 is shown at FIG. 2. Terminal 10 supports two label readers 17 and 19. Reader 17 is located on the chassis 10 platform. Reader 19 is located on a shelf that extends out and over reader 17, such that reader 19 is superimposed over reader 17. In operation, the patron is initially advised by a display 29 to place his library card with its identification label over reader 17. Within terminal 10 is a circuit board 37 containing comparator and data circuitry. The terminal 10 may further include power supply 45, hard magnetic disc drive 39 and/or floppy magnetic disc drive 41.

The processor operates to retrieve a file for a patron, validates the patron identification, and then advises the patron on the display screen that it is ready to check out a book or other article. The patron card may be removed and the article with its two oppositely disposed identification labels may be passed within the field of view of the two readers 17, 19. The article may be held between the two readers or placed on the terminal surface above reader 17. A sensor 43 is disposed adjacent the reader 17 to insure that the article is not removed from the terminal until processing is completed. Should the book be removed from between the readers the sensor 43 may operate to terminate processing of the transaction before sensitizing/desensitizing is effected.

When the processing has been completed the display 29 indicates that the article can be removed from the terminal and another article can be inserted. Keyboard 33 may be used by the patron to respond to questions or selections generated by the processor. Should display 29 have a touch screen capability, the need for keyboard 33 may be eliminated. Other than the cathode-ray-tube monitor, the display 29 can be implemented as a liquid crystal panel, an electroluminescent panel, a plasma panels, a light emitting diode matrix, or a matrix of miniature incandescent lamps.

As noted above the article 11 incorporates a device that may be desensitized by the terminal, so that the article can be passed through a security gate. In the presently preferred embodiment terminal 10 includes sensitizing/desensitizing devices 47 and 49. Sensitizing/desensitizing devices 47, 49 may be implemented by a variety of commercially available devices, such as those sold by Minnesota Mining and Manufacturing of Minneapolis, Minn. The sensitizing/desensitizing devices 47, 49 operate under control of the electronic data processor 23, in response to information such as the patron status, book circulation status and the comparison output from the two readers 17, 19 indicating that only a single article is in place to be sensitized/desensitized.

Figure 3:
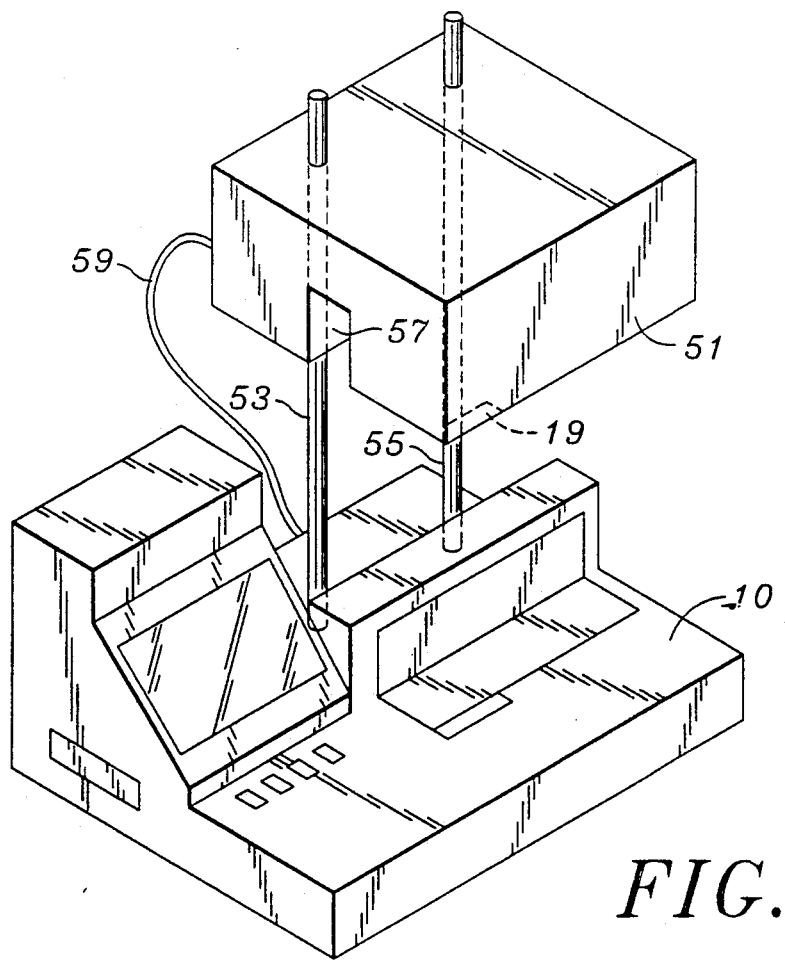
FIG. 3 is a perspective view illustrating a second physical embodiment of the terminal of this invention that can be used for insertion of articles of widely different thickness.

An alternate embodiment of the terminal 10, shown at FIG. 3, facilitates use of the invention in connection with articles that are either extremely thin or thick. In that embodiment reader 19 is disposed within housing 51, which is adapted for vertical displacement relative to reader 21. Reader 21 may remain on a fixed support platform offered by terminal 10. Rails 53, 55 frictionally engage the housing 51 to enable the housing 51 to be maintained at a desired height. The lower portion of housing 51 may incorporate a groove 57 that enables the housing to be lowered for reading the labels on thin articles. Flexible cable 59 provides power and communication between the reader 19 and the previously described components in terminal 10.

As presently contemplated the terminal 10 can be a part of a large library or other circulation monitoring/controlling system where there are many terminals and a large number of articles. Such a system may include a central processor with a data base capacity that is much larger than can be readily incorporated ass a stand-alone data base in each terminal. In this embodiment the terminal may additionally include an access circuit that enables the terminal to communicate information to and from the data base at a high data transfer rate.

The terminal, can be used as a terminal in an inventory system for a large number of two oppositely surfaced labeled articles stocked in the same or in different locations. In such an application the terminal may employ a high speed electronic data processor connected by a communications link to a central high capacity memory capable of storing a large amount of inventory data. The terminal processor is preferably capable of high speed access to the high capacity memory. Both the terminal and the high capacity memory may be connected by communications links to a central monitor station. A monitor station may be used to exercise a supervisory function in the system where it provides instructions to the terminal processor and the high capacity memory, diagnose any malfunction, and remedy or cure the malfunction. The central monitor station can serve as a convenient location to retrieve information from the high capacity memory as well as to determine the operating health of the system.

Though the terminal 10 is described in connection with optical scanners and magnetic security indicia, it should be understood that a variety of different types of labels, scanners and security indicia may be implemented without departing from the broader aspects of the invention. Indeed, it is anticipated that various types of active or passive labels security indicia may be utilized in conjunction with the invention in order to interface with evolving inventory and security systems.

Figure 4:
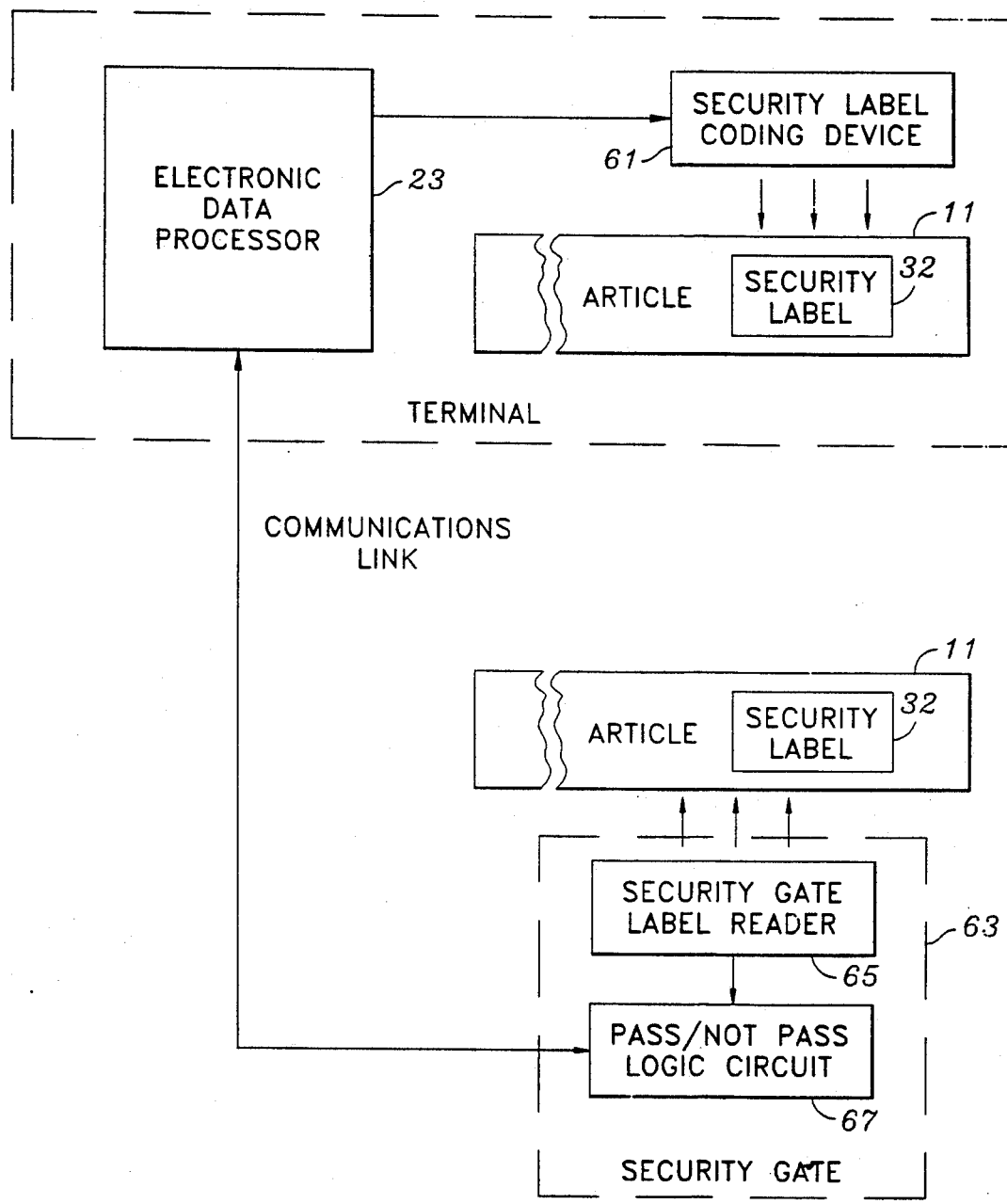
FIG. 4 is a block diagram of the terminal of this invention in a security system showing the components and their interconnections.

An alternate configuration of the terminal in a security system is shown diagrammatically at FIG. 4. In such a system, a security label 30 is attached to the article 11. This label is encoded or decoded at the terminal and is later read at a security gate at an exit or an entrance of the library. The terminal then additionally includes a security label coding device 61 which sets the code in the security label 32 when the article is in the terminal, as a part of the functions being performed by the terminal electronic data processor. Like the processing of the other functions performed by the terminal processor, the article is not removed from the terminal until the security label is encoded. The code is read when the article is in the close vicinity of the security gate 63. The label reader 65 at the security gate feeds an electrical signal representing the code to a pass/not pass logic circuit 67. Should code changes or codes that characterize a particular article be used, there is a communications link between the processor in the terminal and the pass/not pass circuit in the security gate to pass the code from the terminal to the gate and then to confirm to the terminal that the article has passed the gate.

As presently contemplated, the patron and/or article identification labels are formed as a printed bar code which is scanned with a beam of light or a bar code recorded on magnetic tape which is scanned with a reading head. The labels can alternatively be implemented as a miniaturized, coded semiconductor chip transmitter, which includes a static random access memory (SRAM) to store the code, a radio frequency (RF) transmitter and a battery power supply. Such a transmitter may be activated and read by an RF semiconductor chip transmitter-receiver that feeds the received signal to a logic circuit to decode or translate the signal before it is passed to the data processor. In another embodiment the label may be implemented as a miniaturized, coded ultrasonic wave transmitter which includes a SRAM, an ultrasonic transducer, and a power supply. That circuit may be activated and read by an ultrasonic transducer and decoded by a logic circuit. The patron identification label can be, but is not necessarily the same as one of the article identification labels. If it is not the same as one of the article labels, a separate reader is supplied on terminal 10.

As with the patron/article identification labels, various types of security labels may be used within the scope of the present invention. Though conventional magnetic security labels may be used where the terminal and security gate are disposed immediately adjacent each other, other applications may be facilitated by the use of security labels having additional information and capabilities. For example, such additional information may be useful where a variety of sensor stations may be disposed throughout a facility in order to monitor the flow and location of articles within the facility.

In the most conventional embodiment the security label can be implemented as a strip of magnetic material, preferably a soft ferromagnetic material, which is coded to be in one of two states, for example, magnetized or demagnetized, sometimes referred to as sensitized or desensitized. The encoder and reader consists then of an electromagnetic transducer, which can be in the form of a coil of insulated wire.

Alternatively, the security label can be a miniature coded semiconductor assembly where the label can contain an abundance of information about the article, which can include the circulation status, patron/article identification indicia, the return due date of the article, and the nature of the article, e.g. whether it is a document, a tape cassette or a book. The semiconductor device assembly may include a SRAM, which contains the coded information that is fed to an RF transmitter-receiver, and a battery power supply. The encoder at the terminal includes a SRAM, where the code is generated by the terminal electronic data processor, a logic circuit to formulate the code for transmission to the semiconductor device assembly at the article, and an RF transmitter-receiver that activates the semiconductor device assembly and transmits to it the coded information for storage in the semiconductor device assembly SRAM.

The security gate/sensor station may be provided with a reader having the same components as the encoder at the terminal. Its operation, however, is the inverse of the encoder. The SRAM receives the coded information from the electronic data processor at the terminal via a communications link, which has been described as part of the security system depicted at FIG. 5. The reader/encoder RF transmitter activates the device assembly to transmit its coded information to the reader/encoder. The received information is decoded by the logic circuit and compared in the logic circuit to the information in the SRAM, which, as described, was received previously from the terminal via the communications link. The comparison enables the logic circuit to pass or not pass the article through the security gate. The communications link can be implemented by transmitter-receivers that are connected wither by a wire cable, a fiber optic cable, sound waves, light waves, or electromagnetic waves.

Accordingly, one of ordinary skill in the art will recognize that the invention provides significant enhancements with respect to efficiency, reliability and security. Various implementations of the invention may be constructed which utilize one or more novel features of the invention without incorporating each of the advantages provided by the present invention.

What is claimed is:

1. A self check out/check in system which includes a terminal for independently withdrawing or returning articles having duplicate article identifying indicia on opposing planar surfaces thereof, and alterable security indicia disposed on the article for indicating the circulation status of the article, the system comprising:

first and second readers disposed at spaced opposed locations on opposite sides of the article, said first and second readers being operative to substantially simultaneously read both article identifying indicia and for generating first and second article identifying signals in response thereto;

processing circuitry in electrical communication with said first and second readers, said processing circuitry including comparator circuitry for receiving said first and second article identifying signals and for generating a third signal when said first and second article identifying signals are substantially identical; and security indicia control circuitry for altering the security indicia in response to said third signal.

2. The system as recited in claim 1 further comprising user identification circuitry for receiving a user identification card having user identifying indicia disposed thereon, and for generating user identification signal in response thereto.

3. The system as recited in claim 2 wherein said user identification circuitry includes a third reader operative to read the user identification indicia and to generate a fourth signal in response thereto.

4. The system as recited in claim 1 wherein the processing circuitry further comprises user verification circuitry for verifying the status of the identified user.

5. The system as recited in claim 4 wherein said processing circuitry further comprises a first memory circuit for receiving and updating information indicative of the status of a plurality of users.

6. The system as recited in claim 4 wherein said processing circuitry further comprises a memory circuit for receiving and updating information concerning the circulation status of a plurality of articles.

7. The system as recited in claim 4 wherein said processing circuitry further includes patron status enable circuitry for selectively enabling said security indicia circuitry in response to said patron status information.

8. The system as recited in claim 1 further comprising sensor circuitry disposed adjacent said first reader for determining the continued presence of an article intermediate said first and second readers, said sensor circuitry further being operative to disable said security issue device upon removal of the article.

9. The system as recited in claim 1 wherein said article identification indicia is a label comprised of printed bar code information.

10. The system as recited in claim 1 wherein said article identification indicia is a label comprised of a bar code recorded on magnetic tape.

11. The system as recited in claim 1 wherein said article identification indicia is a label comprised of a coded semiconductor chip transmitter.

12. The system as recited in claim 1 wherein said article identification indicia is a label comprised of a coded ultrasonic transmitter.

13. The system as recited in claim 1 wherein said user identification indicia is a label comprised of printed bar code information.

14. The system as recited in claim 1 wherein said user identification indicia is a label comprised of a bar code recorded on magnetic tape.

15. The system as recited in claim 1 wherein said user identification indicia is a label comprised of a coded semiconductor chip transmitter.

16. The system as recited in claim 1 wherein said user identification indicia is a label comprised of a coded ultrasonic transmitter.

17. The system as recited in claim 1 wherein said second reader is vertically translatable with respect to said first reader.

* * * * *